US008570986B2

(12) United States Patent
He et al.

(10) Patent No.: US 8,570,986 B2
(45) Date of Patent: Oct. 29, 2013

(54) SEMI-RANDOM BACK-OFF METHOD FOR ACHIEVING RESOURCE RESERVATION IN WIRELESS LOCAL AREA NETWORKS

(75) Inventors: Yong He, Beijing (CN); Xiao-jun Ma, Beijing (CN); Jun Li, Cranbury, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 99 days.

(21) Appl. No.: 13/386,923

(22) PCT Filed: Jul. 13, 2010

(86) PCT No.: PCT/US2010/001962
§ 371 (c)(1),
(2), (4) Date: Jan. 25, 2012

(87) PCT Pub. No.: WO2011/014231
PCT Pub. Date: Feb. 3, 2011

(65) Prior Publication Data
US 2012/0127969 A1    May 24, 2012

(30) Foreign Application Priority Data

Jul. 29, 2009  (EP) .................................... 09305710

(51) Int. Cl.
*H04W 72/04* (2009.01)
(52) U.S. Cl.
USPC ........... 370/336; 370/252; 370/329; 370/446; 370/447; 370/448
(58) Field of Classification Search
USPC .......................... 370/252, 329, 336, 445–448
See application file for complete search history.

(56) References Cited

U.S. PATENT DOCUMENTS

| 2004/0064508 A1* | 4/2004 | Ayyagari et al. ............... 709/205 |
| 2006/0176896 A1* | 8/2006 | Callaway et al. ............. 370/437 |
| 2006/0268772 A1* | 11/2006 | Ko et al. ........................ 370/329 |
| 2008/0212604 A1* | 9/2008 | Liu ................................ 370/448 |
| 2010/0135319 A1* | 6/2010 | Wang et al. .................... 370/445 |

OTHER PUBLICATIONS

Chonggang Wang, Bo Li, Lemin Li, A new collision resoultion mechanism to enhance the performance of IEEE 802.11 DCF, Jul. 2004, IEEE Transactions on vehicular technology, vol. 53, No. 4, pp. 1235-1246.*
Barcelo et al., "CSMA with Enhanced Collision Avoidance: A Performance Assessment" 2009 ;IEEE 69th Vehicular Technology Conference, Barcelona, Spain, Apr. 26-29, 2009, pp. 1-5.
Barcelo et al., "Learning-BEB: Avoiding Collisions in WLAN" 15th Eunice Open European Summer School 2008, Telecom Bretagne, Brest, France, Sep. 10, 2008, pp. 1-8.
Barcelo et al., "Traffic Prioritization for Carrier Sense Multiple Access with Enhanced Collision Avoidance" Communications Workshops, 2009, Piscataway, NJ, Jun. 14, 2009, pp. 1-5.
International Search Report dated Aug. 25, 2010.

* cited by examiner

*Primary Examiner* — Andrew Chriss
*Assistant Examiner* — Romani Ohri
(74) *Attorney, Agent, or Firm* — Robert D. Shedd; Jerome G. Schaefer

(57) ABSTRACT

A method and apparatus are described including determining if a successful unicast transmission has occurred, adjusting a contention window to a minimum value and adjusting a time slot back-off counter to one-half of the value of the contention window plus one responsive to the determination and adjusting the contention window using one of a plurality of adjustment schemes and selecting said time slot back-off counter from an interval between zero and the contention window.

6 Claims, 2 Drawing Sheets

SEMI-RANDOM BACK-OFF METHOD FOR ACHIEVING RESOURCE RESERVATION IN WIRELESS LOCAL AREA NETWORKS

CROSS-REFERENCE TO RELATED APPLICATIONS

This application claims the benefit, under 35 U.S.C. §365 of International Application PCT/US10/001962, filed 13 Jul. 2010, which was published in accordance with PCT Article 21(2) on 3 Feb. 2011 in English and which claims the benefit of European patent application No. EP09305710.7 filed 29 Jul. 2009.

FIELD OF THE INVENTION

The present invention relates to wireless communications in general and, in particular, to a semi-random back-off method for resource reservation for providing increased throughput while reducing collisions over wireless local area networks (WLANs).

BACKGROUND OF THE INVENTION

In multicast/broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

The popularity of voice and video applications over mobile computing devices has raised concerns regarding the performance of medium access control (MAC) protocols, which are responsible for allocating shared medium resources to multiple communicating stations and resolving collisions that occur when two or more stations access the medium simultaneously. In the current IEEE 802.11 wireless LANs, the distributed coordination function (DCF) of the MAC protocol layer uses a binary exponential back-off (BEB) algorithm for fundamental channel access. The BEB algorithm mitigates the issue of network collisions by randomizing the timing of medium access among stations that share the communication medium. The timing of channel access in the BEB algorithm is randomized by setting the slot counter to a random integer selected from contention window [0, CW] in each back-off cycle, and CW doubles upon failed data transmissions in last back-off cycle. Here a back-off cycle is a procedure where the back-off slot counter decrements down from an initial maximal value to zero. The simplicity and good performance of BEB contribute to the popularity of IEEE 802.11 DCF/EDCA.

However, as demonstrated by both practical experience and theoretical analysis, the BEB algorithm has some deficiencies. First, the collision probability for a transmission attempt increases exponentially with the number of active stations in the network. Second, the medium access delay cannot be bounded and the jitter is variable, which may not be suitable for multimedia applications.

Some concepts/terms that may benefit the understanding of the present invention are provided. A frame is a unit of data. That is, data can be packaged in packets or frames or any other convenient format. As used herein a frame is used to indicate data packaged in a format for transmission. A back-off round/stage/cycle is a procedure in which the back-off slot counter counts down from an initial value (maximum) to zero. When the counter reaches zero, a new transmission is attempted. One frame transmission may involve multiple back-off rounds/stages (because of unsuccessful transmission attempts). As used herein a time slot represents a continuous time period during which the back-off slot counter is frozen. It may refer to either a fixed time period (usually several microseconds) sufficient for the physical layer to perform the carrier sensing once, or a varying time period (usually between hundreds of microseconds to several milliseconds, depending on the length of the packet and physical data rate) when a frame is being transmitted over the shared medium. In a network with shared medium, each station freezes or decreases its back-off slot counter based on the resulting status of the physical or virtual carrier sensing of the medium. Hence, because of the shared nature of the medium, the slot count changes are aligned among the stations. The time slot can be used as a basic time unit to make the entire procedure discrete. Positive integers $n=1, 2, 3, \ldots, N$ are used to indicate the $1^{st}, 2^{nd}, 3^{rd}, \ldots, N^{th}$ time slot, and is used to indicate the status of the shared medium at the nth slot, for example, $I_n=1$ when busy and $I_n=0$ otherwise. The back-off slot count of station i at the nth time slot is denoted as $slot_i(n)$.

In Application Serial Number PCT/US09/01179, a deterministic back-off (DEB) method was described to reduce or avoid collisions. In the DEB method, transmission were deterministically scheduled in time slots In Application Serial Number PCT/US09/001,855, a relaxed deterministic back-off (R-DEB) method was described to overcome issues such as backward compatibility and dependability that are inherent in the deterministic back-off (DEB) method. The R-DEB method selects the back-off slot count in as deterministic a way as possible to reduce or avoid network collisions. The R-DEB method also introduces randomness to this procedure to preserve the flexibility and easy deployment feature of the conventional random back-off methods such as the BEB (binary exponential back-off) method. Hence, the R-DEB method made a compromise between the network efficiency and flexibility, and can be viewed as a combination of the DEB algorithm and BEB algorithm. The initial motivation of the R-DEB algorithm was to adapt the deterministic back-off for video transport systems while maintaining backward compatibility with the previous standards.

The R-DEB operates as follows. A back-off round starts when a station resets its back-off slot count slot(n) to the fixed number M (note that here n is a variable on the timeline). Once it is determined by the physical carrier sensing procedure that the sharing medium is idle for a time slot, the station decreases its back-off slot count by one. If this new slot count satisfies the transmission triggering condition (that is, the new slot count equals one of the elements of the triggering set $Q_T$, e.g., slot(n)=k). The node (station, client device, mobile terminal, mobile device) will get an opportunity to initiate a data transmission (hence "triggering a transmission"). If no frame is to be sent at this time, the node forgoes the opportunity and continues decreasing its slot count. The result of the data transmission determines whether or not the element k should further remain in the triggering set: if there was a successful transmission then this triggering element remain in the triggering set; if there was an unsuccessful data transmission then, with a probability p, a triggering element substitution procedure will be initiated that replaces the old element k with a new one k' from the interval [0, M]. The R-DEB method included a method and apparatus for selecting an element from the interval [0, M−1] for inclusion in the triggering set $Q_T$ to reduce network collisions. It should be noted that a station can be a computer, laptop, personal digital assistant (PDA), dual mode smart phone or any other device that can be mobile.

The notion of resource reservation is a well known and widely used in time division multiple access (TDMA) schemes to achieve high throughput and a certain level of quality of service (QoS) provisioning for asynchronous transfer mode (ATM) networks. In a typical TDMA reservation (R-TDMA) solution, the radio resource is organized into superframes with each superframe divided into multiple time slots of equal length, and a station can subscribe one or more time slots in each superframe as its reserved radio resource by a reservation request. As used herein a node (client, mobile station, mobile device, mobile terminal, station, laptop, computer, personal digital assistant (PDA), dual mode smart phone, . . . ) are all terms that can be used to indicate an end device in a wireless local area network (WLAN). A station can have collision-free channel access in these reserved time slots, thus QoS can be readily achieved. In another flexible version of R-TDMA, reservation ALOHA (R-ALOHA), the radio resource is automatically reserved by tracking the results of data transmission in the previous superframe. A successful transmission in a given time slot in the previous superframe results in a reservation of the same slot for the sender (transmitter) in subsequent superframes. FIG. 1(a) illustrates how the reservation is achieved by R-ALOHA among three stations A, B and C. Station A successfully obtains reserved slot 1 in the first superframe while B and C obtain their reserved slots at the second superframe because stations B and C collide with each other in the first superframe. Simulation results show that R-ALOHA achieves less delay at significantly higher channel utilization than slotted ALOHA.

The beauty of R-AHOHA lies in that, it achieves resource reservation automatically without the involvement of a central coordinator as conventional TDMA solutions usually do. The present invention borrows the idea of R-ALOHA and applies it to carrier sense multiple access (CSMA) based wireless networks. More specifically, the present invention seeks to incorporate the R-ALOHA into distributed coordination function (DCF)/enhanced distributed channel access (EDCA) to improve the QoS performance for content delivery over IEEE 802.11 networks in home environments. The challenge is how to achieve resource reservation in the context of CSMA environments.

Resource reservations in R-ALOHA are possible because of two basic features in a TDMA network, periodicity and synchronization. Periodicity means that each superframe has the same number of equal-length time slots so that a station can easily identify a time slot that it wants to use again in the current superframe. Synchronization makes time slot identification possible because the time slot is exactly the same slot the station used in the previous frame. In fact, as long as a network possesses the aforementioned two features, then resource reservation can be achieved following a similar approach as R-ALOHA.

Now the problem that remains is to determine whether or not a CSMA network possesses the two features—synchronization and periodicity. Generally, a CSMA network cannot be synchronized because of the presence of hidden terminals in multi-hop networks. However, considering a single-hop network where all stations share the same medium and assuming perfect carrier sensing, synchronization can be achieved. Synchronization in a CSMA network means that the back-off slot counters of stations in the network decrement or freeze simultaneously upon the same network event (transmitting or idle) for a time slot. The term "time slot" in CSMA context has a different meaning from that used in TDMA context. It is defined as a continuous time period during which the back-off slot counter freezes. It may last a very short time period (usually several microseconds), sufficient for the physical layer to perform carrier sensing once, or a long time period (usually from hundreds of microseconds to several milliseconds, depending on the frame size and physical data rate) sufficient to complete a frame exchange sequence. Thus the duration of a time slot in a CSMA network varies over time.

Typically, for station A and B that share the same medium, the channel state transition sequence learned by each station should be the same because of the broadcast property of wireless channels. More generally, if not considering hidden terminals, all stations sharing the medium should maintain the same sequence that reflects the utilization history of the medium. This sharing property builds the notion of synchronization of back-off slot counters among stations in the same collision domain.

To achieve periodicity in CSMA networks, deterministic selection of values for the back-off slot counter is introduced in the back-off procedure when a successful transmission occurred in last back-off cycle. Here a back-off cycle is a period of time when the back-off slot counter decrements from the initial value to zero. By deterministic selection, a station's time slot counter is reset to a common deterministic value shared by all stations in the network. This common value defines the periodicity of CSMA network (in terms of time slots).

SUMMARY OF THE INVENTION

Herein, the issue of multiple access in IEEE 802.11 wireless networks will be revisited.

FIG. 1(b) illustrates how resource reservation is achieved in CSMA networks. In the first back-off cycle, station A, B and C each generates a random back-off slot counter as 1, 3, and 3 respectively. Since station A succeeds in data transmission in the 2nd time slot of the first back-off cycle, it resets its slot counter deterministically to 4 after its data transmission, which allows it to access the 2nd time slot again in next back-off cycle. Hence the second time slot is reserved for station A. Station B and C collide at the 4th slot of the first back-off cycle, and stations B and C reset their slot counters to random values, for example 3 and 5 respectively, which allows them to access the 3rd and 5th time slots respectively in the next back-off cycle without collision. Again, by setting their time slot counters to 4, both B and C can have reserved time slots for channel access in subsequent back-off cycles. The common value 4 gives the periodicity of network.

Therefore, in CSMA networks, resource reservation is achieved by introducing periodicity into the back-off procedure. Periodicity relies on the low-level carrier sense mechanism to synchronize the network. The performance of resource reservation is affected by many factors, such as carrier sense accuracy, hidden terminals, etc.

The present invention describes a method to achieve resource reservation in IEEE 802.11 wireless networks. In the method of the present invention, a reservation component is introduced into the back-off algorithm which allows a station to deterministically set its back-off time slot counter upon successful unicast transmission in a previous cycle. Resource reservation is achieved by reusing a time slot in consecutive back-off cycles. This method can be applied in the current IEEE 802.11 DCF/EDCA with least modification to the current software and/or hardware, but brings the extra advantage of reduced network collisions and thus higher throughput and less network delay. It is believed that multimedia applications including audio, video etc. will benefit from the method of the present invention.

A method and apparatus are described including determining if a successful unicast transmission has occurred, adjusting a contention window to a minimum value and adjusting a time slot back-off counter to one-half of the value of the contention window plus one responsive to the determination and adjusting the contention window using one of a plurality of adjustment schemes and selecting said time slot back-off counter from an interval between zero and the contention window.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
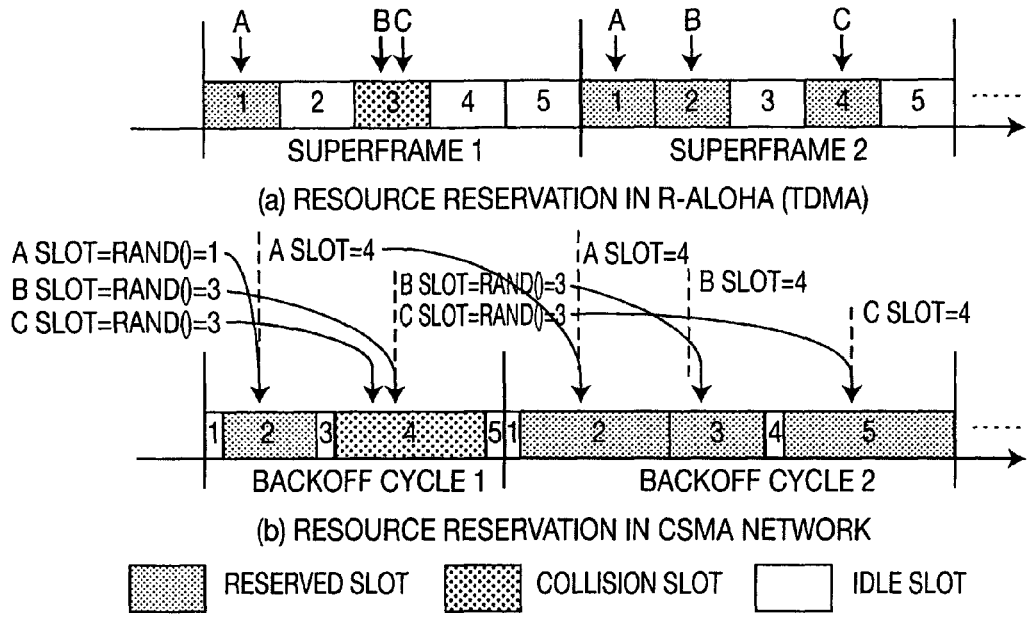
FIG. 1(a) illustrates how the reservation is achieved by R-ALOHA among three stations A, B and C.
FIG. 1(b) illustrates how resource reservation is achieved in CSMA networks.

1. The Concept Of Semi-Random Back-Off (SRB)

Suppose that the frame for use in a network begins at time slot $0$. Denote $slot_i(n)$ as the value of back-off time slot counter of station i at the $n^{th}$ time slot. For a given transmission opportunity (TXOP), if all data transmissions are successful, indicated by acknowledgements, it can be said that this TXOP is positive; otherwise, it is said that this TXOP is negative. Note that in IEEE 802.11 MAC, broadcast and/or multicast (B/M) data are usually not acknowledged so broadcast and multicast data are treated as if a TXOP transmitting broadcast (multicast) data (B/M data) is negative.

Defining $I_{txop}$ as the state of TXOP in last back-off cycle. The semi-random backoff (SRB) method of the present invention can be described as follows. Whenever $slot_i(n)$ reaches zero and needs to be reset, its value is updated by $$slot_i(n+1) = \begin{cases} M & \text{If } I_{txop} = \text{positive} \\ rand(0, CW) & \text{If } I_{txop} = \text{negative} \end{cases} \quad (1)$$

where CW represents the back-off contention window as defined in conventional random back-off methods, and M is a common integer shared among stations in the network. Equation (1) states that, when the previous TXOP is positive, which usually indicates a successful transmission (for unicast only), then the slot counter is reset to a deterministic value M; otherwise, it is reset to a random value from the back-off contention window, as a conventional random back-off scheme does.

One can realize that SRB contains a random component and a deterministic component. The back-off procedure follows a conventional approach in the random component but it introduces periodicity in the deterministic component. A station chooses which component to reset its back-off time slot counter after the station determines whether a TXOP is positive or negative in previous back-off cycle.

In Equation (1), CW is a time-varying parameter among stations that can be controlled by different random back-off methods. For example, the change of CW can follow a binary exponential increase when applying SRB to DCF/EDCA, or follow other varying patterns like exponential increase exponential decrease (EIED) or linear increase linear decrease (LILD). On the other hand, M is a fixed parameter for a station used for reservation. In the context of DCF/EDCA, M is set to $(CW_{min}+1)/2$ so as to keep the average delay of SRB equal to the smallest delay in binary exponential back-off (BEB). M can also be different for stations, in which case the service ring size is defined by the greatest comment divisor (gcd) of different M in the network.

The parameter M in the deterministic component of SRB defines the periodicity to reserve channel resources. The access procedure in SRB can be best described using a service ring including M fixed time slots. Determining a value for the back-off time slot counter is equivalent to selecting a time slot from the ring. When using the random component for back-off, the time slot is randomly selected from the ring, whereas when using the deterministic component for back-off, the time slot is reserved because the back-off interval equals the ring size which allows the method of the present invention to repeatedly use the same time slot in subsequent back-off cycles.

Figure 2:
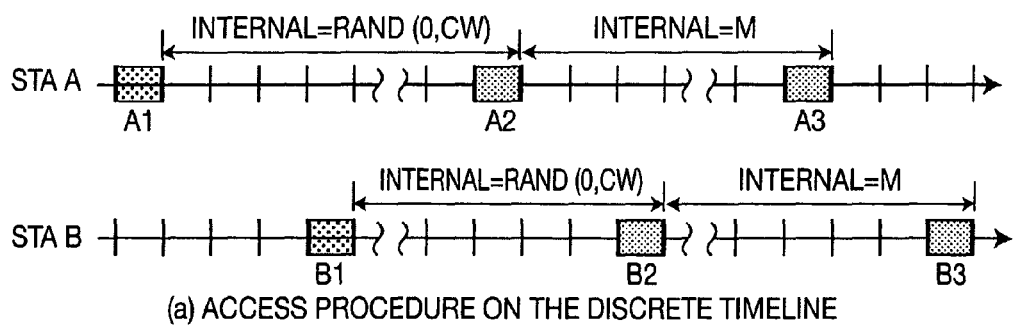
FIG. 2(a) shows the access procedure on discrete timeline.
FIG. 2(b) shows the access procedure on the service ring.
Figure 2:
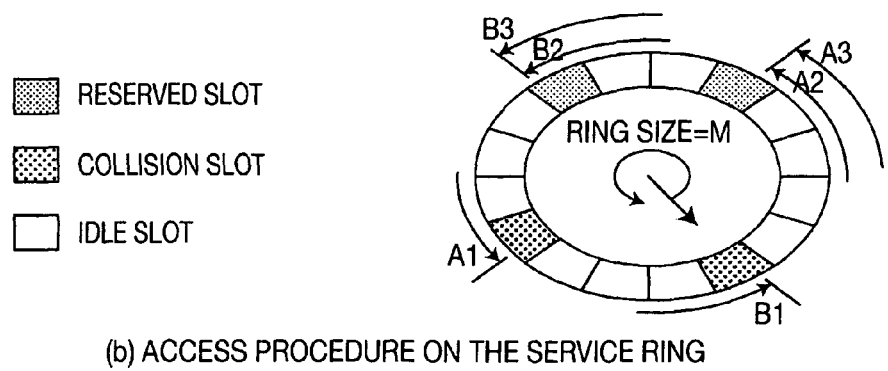

FIG. 2(a) shows the access procedure as a discrete timeline while FIG. 2(b) shows the access procedure as a service ring. When station A collides at time slot A1, it resets its back-off counter to a random value, which allows station A access the channel at time slot A2. Since station A was successful in transmitting data at time slot A2, station A deterministically sets its back-off counter to M. On the service ring, setting the back-off time slot counter to M means a revisit of the previous slot. That is, time slots A2 and A3 correspond to the same slot on the ring. Thus resource reservation is achieved. For stations A and B, as long as they reserve different time slots on the ring, stations A and B can have collision-free channel access in the network. Herein, the deterministic component is also called the reservation component.

The role of the service ring in the SRB is similar to that of the superframe in the R-ALOHA. The primary difference between them is that in SRB the length of a time slot is variable while in R-ALOHA it is fixed. SRB should be more efficient than R-ALOHA because the time wasted in idle is minimized since an idle time slot has the shortest length in time.

Although the principle of SRB is described in terms of single-hop networks without any error, it can also be applied to multi-hop and error-prone networks, at the cost of reduced performance gain. As discussed, resource reservation is best achieved in single-hop networks without carrier sense error. However, for a multi-hop and error-prone network, the presence of hidden terminals, carrier sense errors and the channel errors can impair resource reservations—the former two factors lead to an unsynchronized back-off procedure among stations that destroys the synchronization. The last factor results in poor resource reservation performance because most TXOPs are recognized as negative. In such circumstances, the SRB uses the random component for back-off. Thus, the performance gain due to resource reservation would be reduced.

When new stations join the network, a new station first uses the random component to select a time slot for data transmission, which may cause network collisions for the first several back-off cycles after the new station joins the network. However, the collision probability decreases with network evolvement because more and more stations would use reserved time slots for data transmission.

2. Semi-Random Back-Off in a General Case

It has been assumed, thus far, that each station in the network maintains the same parameter M for resource reservation. Since stations have a service ring with the identical size, as long as a station chooses a time slot different from other stations in the service ring as its reserved time slot, then each station will experience collision-free channel access. However, when stations have service rings of different sizes, or stations maintain a different reservation parameter M, a time slot reserved by a station may still collide with other reserved slots of other stations. Consider two stations i and j in a single-hop network with different reservation parameter $M_i$ and $M_j$ respectively. Suppose that in a certain back-off cycle, both have collision-free channel access and, thus, stations i and j enter into the reservation state in subsequent back-off cycles. For a time slot in the current back-off cycle, say time slot l, the time slot counters of the two stations should be different from each other (to allow collision-free channel access in this cycle), $slot_i(l) \neq slot_j(l)$. It is necessary to find what value of $M_i/M_j$ would lead to collision-free reserved time slots for station i and j in subsequent back-off cycles. Note that the service ring size is $M_i$ for station i and $M_j$ for station j.

After k time slots, the value of time slot counters of station i and j would become $$slot_i(k+l) \equiv slot_i(l) - k \bmod M_i \quad (2)$$

$$slot_j(k+l) \equiv slot_j(j) - k \bmod M_j \quad (3)$$

To allow collision-free channel access, station i and j should hold different time slot counters in all time slots subsequent to slot l, i.e. $slot_i(k+l) \neq slot_j(k+l)$ for all $k \geq 0$. This implies $$a \cdot M_i + slot_i(l) \neq b \cdot M_j + slot_j(l) \text{ for } \forall a, b \in Z \quad (4)$$

From congruence theory, this is equivalent to saying that $d_{ij}$ cannot be divided by $(slot_i(l) - slot_j(l))$, where $d_{ij}$ is the greatest common divisor (gcd) of $M_i$ and $M_j$. Therefore, it is believed that, Lemma I. To have collision free reserved slots between station i and j, $slot_i(l)$ and $slot_j(l)$ should fall in different congruence classes modulo $d_{ij}(=gcd(M_i, M_j))$.

For a N-station network with reservation parameters $M_1, M_2, \ldots, M_N$, Lemma I should follow for any pair of stations. Denote $slot_i(l)$ ($1 \leq i \leq N$) as the values of time slot counters at a time slot l, then by the congruence theory, Theorem I. Let $d = gcd(M_1, M_2, \ldots, M_N)$, then the sufficient condition to have collision-free reserved slots in the system is that $slot_i(l)$ ($1 \leq i \leq N$) should fall in different congruence classes modulo d.

The factor d defines the size of a common service ring in the network, and the service ring of each station is a multiple of such common service ring. Note that $slot_i(l)$ ($1 \leq i \leq N$) is determined by the random selection component of SRB. Thus, as long as two stations select different time slots from the common service ring as their reserved slots, then they would have collision-free channel access in subsequent back-off cycles. Moreover, in some cases, two stations can multiplex a time slot in the common service ring without collision.

The discussion on different sizes of service ring in the network is of particular use when applying SRB in the IEEE 802.11 EDCA, where data of different priorities using different reservation parameter M for channel access.

3. SRB in IEEE 802.11 DCF/EDCA

Next, how to apply the concept of SRB by integrating SRB into the prevalent MAC IEEE 802.11 DCF/EDCA protocols is discussed. Since both protocols build on the BEB (binary exponential back-off), the focus is on how to adapt the concept of SRB to the BEB mechanism. For clarity, the prefix S is used to refer to a method with SRB capability, like S-BEB, S-DCF and S-EDCA.

As discussed above, the major difference between SRB and a general random back-off method is that a reservation component is introduced in SRB in addition to the usual random component. By adding a reservation component, BEB evolves to S-BEB. In S-BEB, the reservation parameter M is set to $(CW_{min}+1)/2$. Note that in BEB the average interval between immediate successful transmissions is $(CW_{min}+1)2$ time slots, thus choosing $(CW_{min}+1)/2$ for M keeps the average delay of S-BEB in reservation state comparable to the smallest delay (on average) in BEB.

Pseudo-code for S-BEB is as follows.

```
1   If last transmission was successful Then
2       CW ← CW_min
3       If it was a unicast transmission Then
4           slot_i(n) ← ⌊(CW min + 1)/2⌋          /*reservation component*/
5       Else
6           slot_i(n) ← rand(0, CW)
7       End If
8   Else
9       CW = min(CW × 2 + 1, CW_max)
10      slot_i(n) ← rand(0, CW)
11  End if
```

In the pseudo-code, lines 3 and 4 deal with the reservation component.

Figure 3:
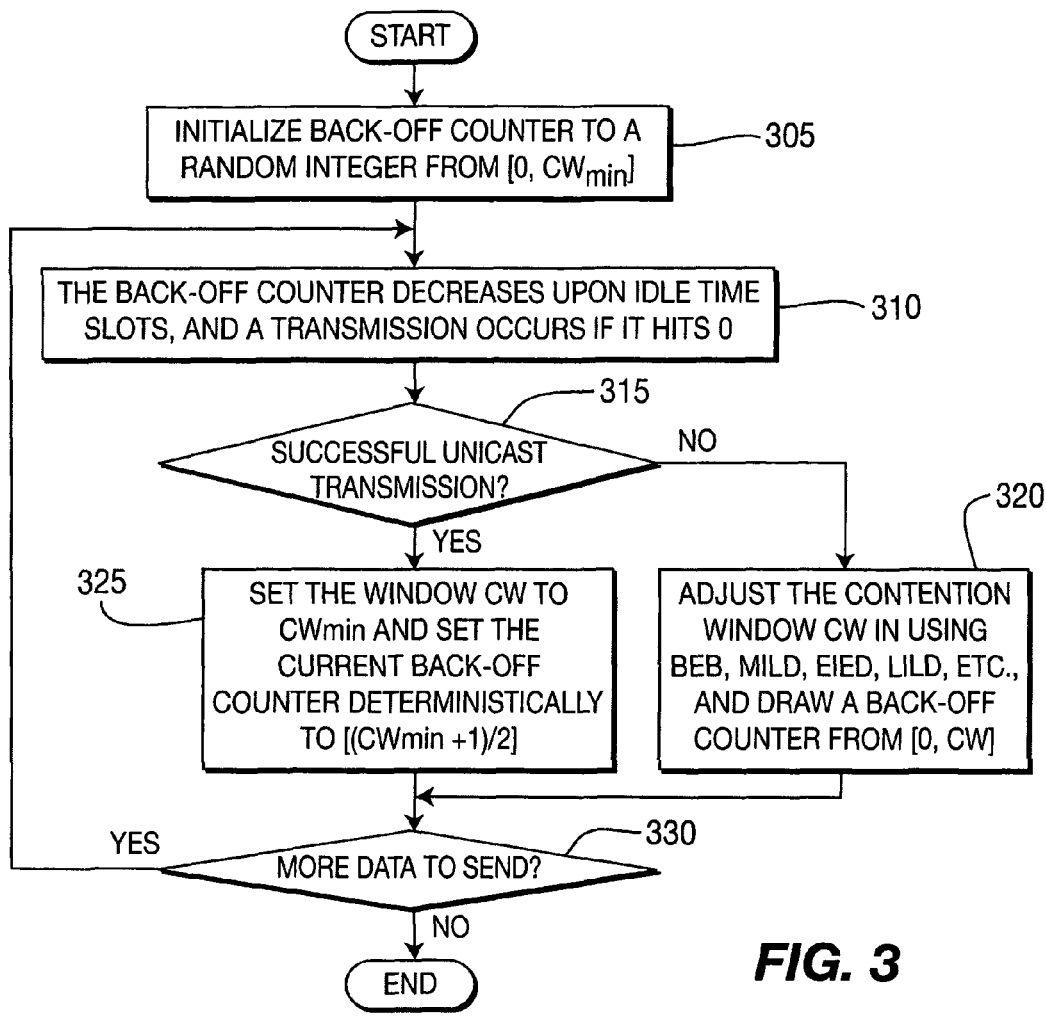
FIG. 3 is a flowchart of an exemplary semi-random back-off method for resource reservation in accordance with the principles of the present invention.

FIG. 3 depicts a flowchart of an exemplary method for resource reservation in accordance with the principles of the present invention. Further, the exemplary processes illustrated in at least FIG. 3 and text below are operationally implemented in either the host processing system or the wireless communication module or a combination of the host processing system and the communication module. The block diagram (FIG. 4 described below) thus fully enables the various methods/processes to be practiced in hardware, software, firmware, a field programmable gate array (FPGA), an application specific integrated circuit (ASIC), a reduced instruction set computer (RISC) or any combination thereof. At 305 the user (station, node, client device, mobile terminal, mobile device) has its back-off counter initialized to a random value from the interval [0, $CW_{min}$]. At 310 the back-off counter is decreased by one upon each idle time slot, and whenever it reaches zero, a data transmission commences. At 315 a test is performed to determine if the last transmission was a successful unicast transmission. If the last transmission was not a successful unicast transmission, then the contention window (CW) size is adjusted at 320 following a conventional way as used for IEEE 802.11 DCF/EDCA or other methods. For example, CW can be tuned according to the results of last transmission by exponential increase exponential decrease (EIED), linear increase linear decrease (LILD), multiplicative increase linear decrease (MILD), etc. The back-off counter is randomly drawn from the interval [0, CW]. Otherwise if the last transmission was a successful unicast transmission, then the contention window CW is reset to $CW_{min}$, and the back-off counter is set to a deterministic value $(CW_{min}+1)/2$ at 315. A further test is performed at 330 to determine whether the node(station, user, client device, mobile device, mobile terminal) has more data to send. If it has more data, then the processing continues at 310. Otherwise, this processing ends. What makes the method of the present invention semi-random is the concept that the setting of the slot count to a random number in the interval (0, CW) occurs only if there is an unsuccessful transmission indicated by no acknowledgement from the receiver. If there has been a successful transmission at a certain time slot in previous back-off cycle, then the user (station, node, client device, mobile device, mobile terminal)) reserves that time slot at step 325 at the current back-off cycle. It should be noted that while a scheme involving incrementation is used herein, such a scheme is exemplary and a decrementation scheme could be used just as easily.

As in EDCA $CW_{min}$ varies for different access categories (ACs), there is also a different reservation parameter M for these ACs. There are four access categories in EDCA as defined in the standard: voice (VO), video (VI), best effort data (BE) and background data (BK). When using the default settings in IEEE 802.11e EDCA, $CW_{min}(VO)=7$, $CW_{min}(VI)=15$, $CW_{min}(BE)=31$ and $CW_{min}(BK)=31$. Hence the reservation parameter for each access category should be $M_{VO}=(7+1)/2=4$, $M_{VI}=(15+1)/2=8$, $M_{VO}=(31+1)/2=16$ and $M_{VO}=(31+1)/2=16$. Clearly the common divisor should be d=4, which is the reservation parameter for voice applications.

It is worth noting that although in the description the parameter M is fixed for a station or an access category, it can also be a time-varying value that changes adaptively to the network congestion level. In this case, many methods that are used to evaluate the network congestion level can be employed here. For example, if the number of active stations in the network is estimated to be S, then M can be $a\times(CW_{min}+1)/2$, where "a" is the minimal integer that satisfies $a\times(CW_{min}+1)/2 \geq S$. Obviously, "a" changes over time. Such a scheme can be readily integrated into SRB by a small change to the reservation component in SRB. As in FIG. 3, it is only necessary to change step 325 to say that the back-off counter is reset to $a\times(CW_{min}+1)/2$ (instead of $(CW_{min}+1)/2$).

A salient feature of the proposed method is that stations in a single collision domain can be served in a round robin manner because each subscribes to a dedicated time slot from the service ring.

Figure 4:
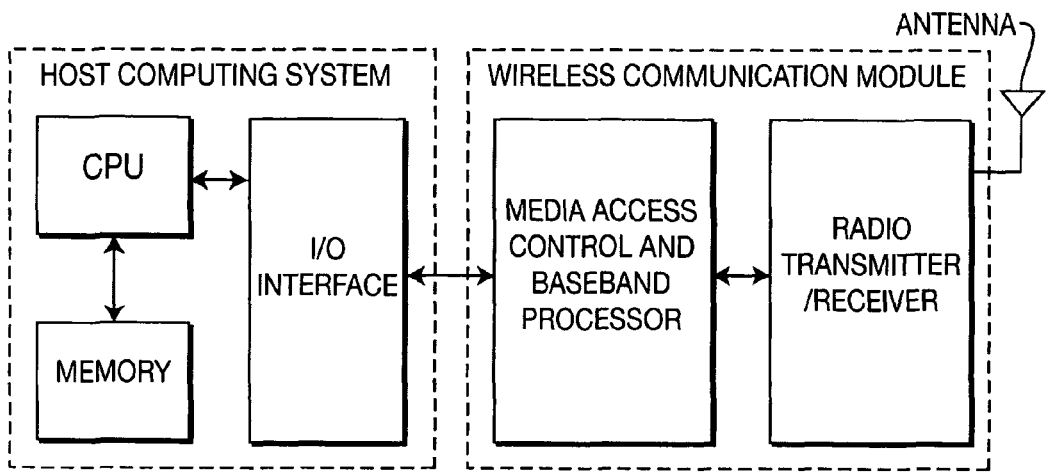
FIG. 4 is a block diagram of an exemplary embodiment of an apparatus implementing the semi-random back-off method of the present invention.

The block diagram of FIG. 4 may be implemented as hardware, software, firmware, a field programmable gate array (FPGA), an application specific integrated circuit (ASIC), a reduced instruction set computer (RISC) or any combination thereof. Further, the exemplary processes illustrated in the various flowcharts and text above are operationally implemented in either the host processing system or the wireless communication module or a combination of the host processing system and the communication module. The block diagrams thus fully enable the various methods/processes to be practiced in hardware, software, firmware, a field programmable gate array (FPGA), an application specific integrated circuit (ASIC), a reduced instruction set computer (RISC) or any combination thereof.

FIG. 4 is a block diagram of an exemplary embodiment of an apparatus implementing the semi-random back-off method of the present invention. The present invention can be implemented in either an end user device or a server, base station (BS), access point (AP) or other controller. To that end the block diagram is the same or similar for all such devices and an exemplary embodiment is shown in FIG. 4. Since the present invention can be implemented in software the host computing system is shown with a CPU and memory which can be used in combination to store and execute instructions to perform the method of the present invention. The CPU could just as easily be replaced by or augmented by hardware or firmware including an ASIC, a FPGA, a RISC processor or any other appropriate combination of hardware, software or firmware. The host computing system communicates with a wireless communication module via an input/output (I/O) interface. The device communicates with other devices via the wireless communication module which includes a media access control and baseband processor, radio transmitter/receiver and at least one antenna.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
determining if a successful unicast transmission has occurred;
if a successful unicast transmission has occurred, adjusting a contention window to a minimum value and adjusting a time slot back-off counter to one-half of the value of said contention window plus one;
adjusting a service ring size responsive to said time slot back-off counter; and
adjusting said contention window using one of a plurality of adjustment schemes and selecting said time slot back-off counter from an interval between zero and said contention window.

2. The method according to claim 1 wherein said adjustment schemes include binary exponential back-off, multiplicative increase linear decrease, exponential increase exponential decrease and linear increase linear decrease.

3. The method according to claim 1 further comprising:
determining if there is more data to transmit; and
transmitting said data responsive to said determination.

4. An apparatus comprising:
means for determining if a successful unicast transmission has occurred;

means for adjusting a contention window to a minimum value and adjusting a time slot back-off counter to one-half of the value of said contention window plus one if a successful unicast transmission has occurred;

means for adjusting a service ring size responsive to said time slot back-off counter; and means for adjusting said contention window using one of a plurality of adjustment schemes and selecting said time slot back-off counter from an interval between zero and said contention window.

5. The apparatus according to claim 4, wherein said apparatus is one of a mobile device, a server and a base station.

6. The apparatus according to claim 4, further comprising:
means for determining if there is more data to transmit; and
means for transmitting said data responsive to said determination.

* * * * *